United States Patent
Qi et al.

(10) Patent No.: US 12,520,064 B2
(45) Date of Patent: Jan. 6, 2026

(54) CONTROL METHOD, APPARATUS, AND ELECTRONIC DEVICE

(71) Applicant: Lenovo (Beijing) Limited, Beijing (CN)

(72) Inventors: Yu Qi, Beijing (CN); Zihu Yang, Beijing (CN); Baolin Liu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 67 days.

(21) Appl. No.: 18/361,761

(22) Filed: Jul. 28, 2023

(65) Prior Publication Data

US 2024/0048873 A1 Feb. 8, 2024

(30) Foreign Application Priority Data

Jul. 29, 2022 (CN) .......................... 202210909823.0

(51) Int. Cl.
*H04Q 9/00* (2006.01)
*F16M 11/24* (2006.01)
*G01G 23/36* (2006.01)

(52) U.S. Cl.
CPC .............. *H04Q 9/00* (2013.01); *F16M 11/24* (2013.01); *G01G 23/36* (2013.01)

(58) Field of Classification Search
CPC .................................. H04Q 9/00; F16M 11/24
USPC ......................................................... 248/550
See application file for complete search history.

(56) References Cited

U.S. PATENT DOCUMENTS

| 11,178,455 | B1 * | 11/2021 | Lee | .................. H04N 21/43637 |
| 2022/0147178 | A1 * | 5/2022 | Kim | ...................... G06F 1/1624 |
| 2023/0152594 | A1 * | 5/2023 | Davidson | ................ G06F 1/203 |
| | | | | 359/601 |
| 2024/0210709 | A1 * | 6/2024 | Davidson | ................ G06F 3/011 |

* cited by examiner

*Primary Examiner* — Muhammad Ijaz
(74) *Attorney, Agent, or Firm* — ANOVA LAW GROUP, PLLC

(57) ABSTRACT

A control method includes, in response to detecting that an external device is in a target positional relationship with an electronic device, adjusting a working parameter of a supporting assembly of the electronic device, so that the supporting assembly is in a normal working state. In the normal working state, the supporting assembly is able to support the electronic device in different postures.

17 Claims, 23 Drawing Sheets

Second relative positional relationship

CONTROL METHOD, APPARATUS, AND ELECTRONIC DEVICE

CROSS-REFERENCE TO RELATED APPLICATION

This application claim priority to Chinese Patent Application No. 202210909823.0, filed on Jul. 29, 2022, the entire content of which is incorporated herein by reference.

TECHNICAL FIELD

The present disclosure relates to the technical field of device control and, more particularly, to a control method, apparatus, and electronic device.

BACKGROUND

In order to adapt to usage scenarios with different height requirements, a display screen can be fixed in a specific posture through a lifting platform.

However, in a process of using the display screen, a user may connect a variety of devices, such as a flash drive, a fan, or a lighting lamp, to the display screen, which causes weight of the display screen to change, so that fixing of the display screen through the lifting platform is unstable. As a result, the display screen cannot be fixed in a specific posture, which affects user experience of using the display screen.

SUMMARY

In accordance with the disclosure, there is provided a control method including, in response to detecting that an external device is in a target positional relationship with an electronic device, adjusting a working parameter of a supporting assembly of the electronic device, so that the supporting assembly is in a normal working state. In the normal working state, the supporting assembly is able to support the electronic device in different postures.

Also in accordance with the disclosure, there is provided an electronic device including a supported assembly configured to connect with an external device, a supporting assembly at least configured to support the supported assembly in a normal working state, so that the electronic device is able to be in different postures, and a control apparatus configured to adjust a working parameter of the supporting assembly in response to detecting that an external device is in a target positional relationship with the electronic device, so that the supporting assembly is in the normal working state.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

Figure 1:
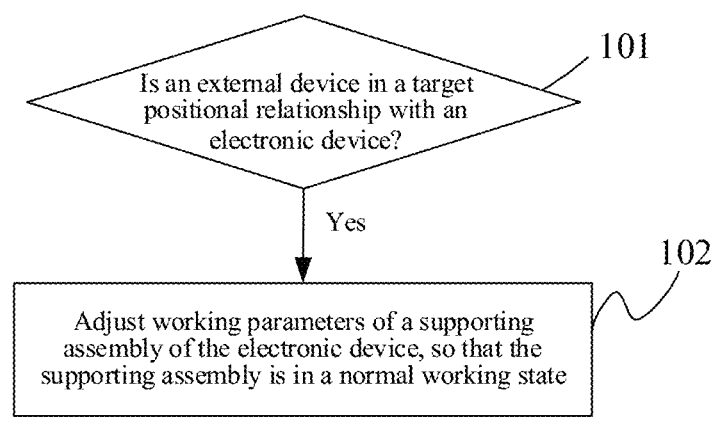
FIG. 1 is a flowchart of a control method according to an example embodiment of the present disclosure.

FIG. 1 is an implementation flowchart of a control method according to an example embodiment of the present disclosure. The method can be applied to a supporting assembly that can support an electronic device in different postures, such as a bracket supporting a display screen at corresponding heights or angles. The technical solutions in the embodiments of the present disclosure are mainly used to improve user experience of the electronic device.

In some embodiments, the method consistent with the present disclosure includes the following processes.

Process 101, detecting whether any external device is in a target positional relationship with the electronic device, and performing process 102 when it is detected that at least one external device is in a target positional relationship with the electronic device.

Figure 2:
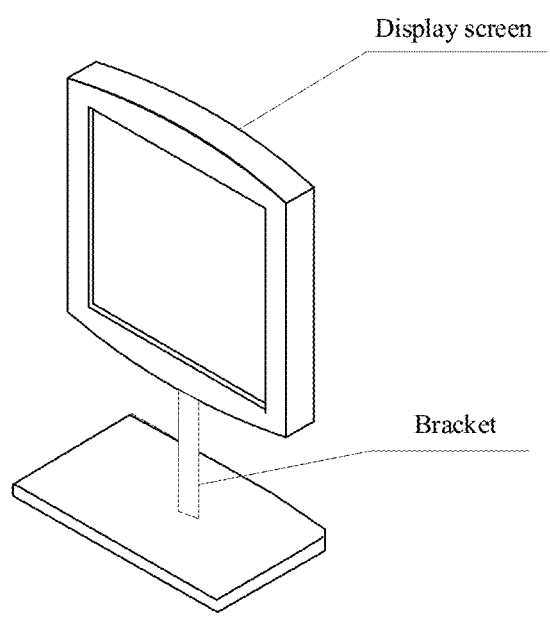
FIG. 2 is an example diagram of an electronic device according to an embodiment of the present disclosure.
Figure 3:
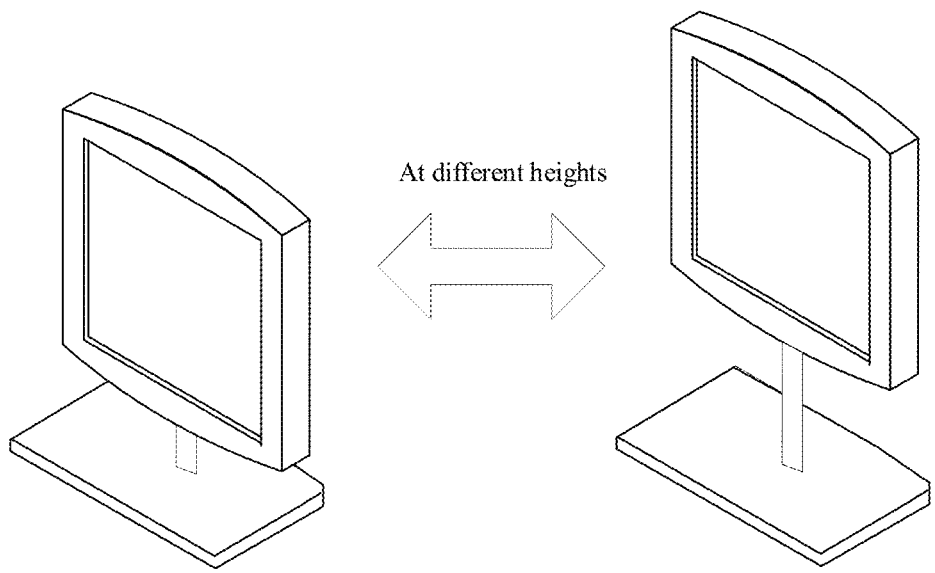
FIG. 3 is an example diagram showing a posture of an electronic device according to an embodiment of the present disclosure.
Figure 4:
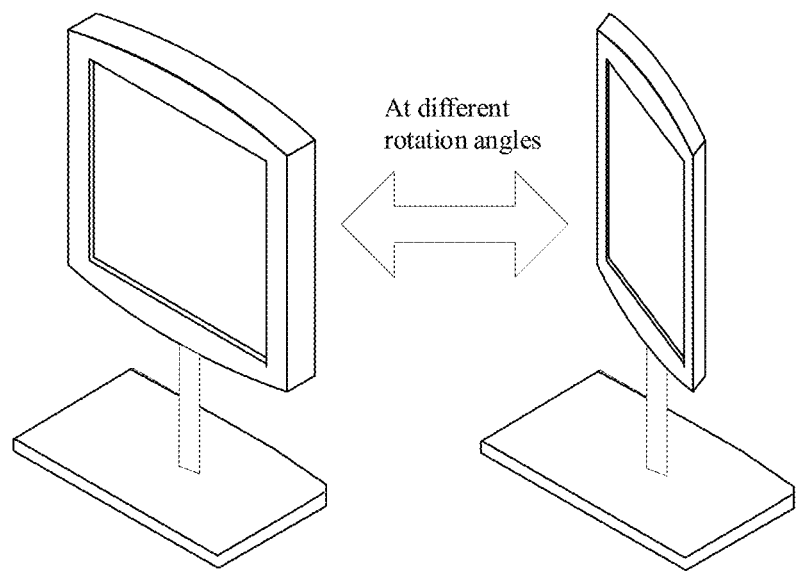
FIG. 4 is an example diagram showing another posture of an electronic device according to an embodiment of the present disclosure.

The electronic device may be a device including a supporting assembly and a supported assembly. As shown in FIG. 2, the electronic device includes a bracket part and a display screen part. The supporting assembly is configured to support the electronic device in different postures, and the different postures herein can be understood as different relative states between the supporting assembly and the supported assembly. For example, the supported assembly is at different heights relative to the supporting assembly, as shown in FIG. 3. As another example, the supported assembly is at different rotation angles relative to the supporting assembly, as shown in FIG. 4.

Figure 5:
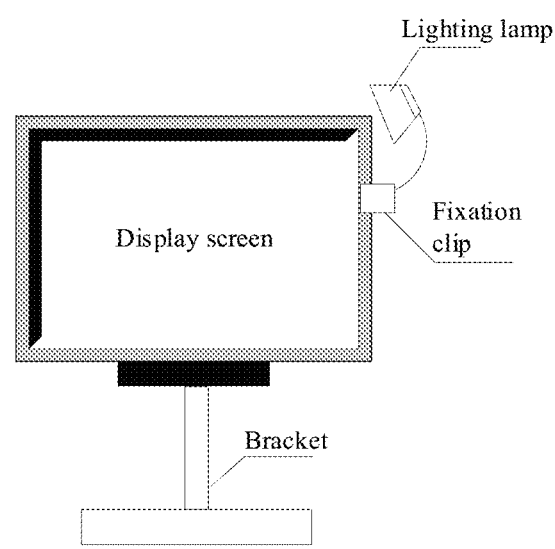
FIG. 5 is an example diagram showing a lighting lamp being arranged at a display screen.
Figure 6:
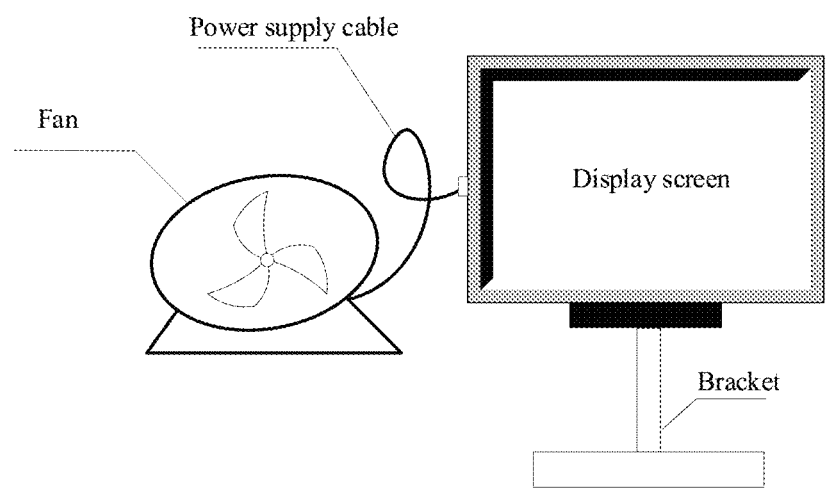
FIG. 6 is an example diagram showing a fan being connected to a display screen.

In addition, the external device may be a device that can realize a physical connection with the electronic device, such as a mobile hard disk, a flash drive, a fan, or a lighting lamp. In one case, the external device can be physically connected to the electronic device. For example, the lighting lamp (self-powered) is connected to one side of the display screen with a fixation clip, as shown in FIG. 5. In another case, the external device can establish a physical connection and communication connection with the electronic device through an electronic interface. For example, the fan is placed on a desktop, and a power supply cable of the fan is connected to an interface at one side of the display screen, as shown in FIG. 6. An external interface herein may be any of various types of interfaces, such as a power supply interface, a Universal Serial Bus (USB) interface, a parallel interface, or an audio interface.

The target positional relationship between the external device and the electronic device can be understood as a positional relationship in which the external device can exert a force on the electronic device so that weight carried by the supporting assembly of the electronic device changes. For example, in FIG. 5, the lighting lamp is fixedly connected to one side of the display screen, so that weight of the lighting lamp and the fixation clip increases weight carried by the bracket of the display screen in addition to weight of the display screen. As another example, in FIG. 6, the power supply cable of the fan is connected to one side of the display screen, so that at least part of weight of the power supply cable increases the weight carried by the bracket of the display screen in addition to the weight of the display screen. A change in the weight carried by the supporting assembly may cause the supporting assembly to no longer be in a normal working state, and therefore the supporting assembly cannot support the electronic device in different postures.

Process 102, adjusting working parameters of the supporting assembly of the electronic device, so that the supporting assembly is in a normal working state.

In a normal working state, the supporting assembly can support the electronic device in different postures.

In some embodiments, working parameters corresponding to a supporting force that the supporting assembly can provide may be adjusted, so that the supporting assembly can support the electronic device in different postures.

For example, in some embodiments, the working parameters of the supporting assembly can be adjusted to a preset maximum value, so that the supporting force provided by the supporting assembly is a maximum value, which enables the supporting assembly to support the electronic device in different postures. As another example, in some embodiments, the working parameters of the supporting assembly can be adjusted to correspond to the weight carried by the supporting assembly, so that the supporting force provided by the supporting assembly corresponds to the weight carried by the supporting assembly, which enables the supporting assembly to support the electronic device in different postures.

The weight carried by the supporting assembly may include a sum of weight of the supported assembly and all or part of weight of the external device.

It can be seen from the above scheme that in the control method consistent with the present disclosure, the external device is detected, and then when it is detected that there is a target positional relationship between the external device and the electronic device, it can be determined that the supporting assembly may not be in a normal working state due to a change in the weight carried by the supporting assembly. Therefore, in some embodiments, the working parameters of the supporting assembly can be adjusted, so that the supporting assembly can be in a normal working state, and then the supporting assembly can support the electronic device in different postures. As such, a situation in which the user experience of the electronic device is poor because the electronic device cannot be in different postures due to the external device is avoided, which achieves a purpose of improving the use experience of the electronic device.

In an implementation manner, when the working parameters of the supporting assembly are adjusted in process 102, it may be implemented in the following manner.

Weight parameters of the external device are obtained first, and then the working parameters of the supporting assembly are adjusted based on the weight parameters.

The weight parameters of the external device may be an entire weight or part of the weight of the external device. Therefore, since the supporting assembly may not be in a normal working state due to a change in the weight carried by the supporting assembly caused by the external device, in some embodiments, the working parameters of the supporting assembly can be adjusted according to the weight parameters of the external device, so that the supporting assembly can be in a normal working state, and then the supporting assembly can support the electronic device in different postures. As such, a situation in which the user experience of the electronic device is poor because the electronic device cannot be in different postures due to the external device is avoided, which achieves a purpose of improving the use experience of the electronic device.

In some embodiments, there may be one or more external devices in a target positional relationship with the electronic device, and there may be multiple target positional relationships between each external device and the electronic device. Therefore, in some embodiments, the weight parameters of each external device can be obtained in any of the following manners.

In an implementation manner, the weight parameters of the external device are obtained when the external device and the electronic device are in a first target positional relationship, and the first target positional relationship represents that the external device completely relies on the supported assembly of the electronic device for carrying. In this scenario, an entire weight of the external device is fully exerted on the supported assembly. The weight parameters obtained herein represent the entire weight of the external device, and the supported assembly relies on a support of the supporting assembly.

That is to say, when the external device completely relies on a support of the supported assembly, in some embodiments, the weight parameters of the entire weight of the external device are obtained, and then the working parameters of the supporting assembly are adjusted based on the weight parameters.

For example, in FIG. 5, the lighting lamp completely relies on a support of the display screen. In this case, an entire weight of the lighting lamp is obtained in some embodiments, and then working parameters of the bracket are adjusted according to the obtained weight parameters, so that the bracket can support the display screen at different heights or different angles.

In an implementation manner, weight parameters of the external device carried by the supported assembly of the electronic device are obtained when the external device and the electronic device are in a second target positional relationship, and the second target positional relationship represents that the external device partially relies on the supported assembly for carrying. In this scenario, only part of the weight of the external device is exerted on the supported assembly, and the rest is exerted on the supporting assembly or a platform where the supporting assembly is located. The weight parameters obtained herein represent part of the weight of the external device, and the supported assembly relies on the support of the supporting assembly.

That is to say, when the external device only partially relies on the support of the supported assembly, in some embodiments, just the weight parameters of the external device carried by the supported assembly, i.e., weight parameters corresponding to part of the weight exerted by the external device on the supported assembly, are obtained. Weight parameters of the external device carried by the supporting assembly and weight parameters of the external device carried by the platform may not be considered. Then, in some embodiments, the working parameters of the supporting assembly are adjusted based on the obtained weight parameters.

For example, in FIG. 6, only power supply cable part of the fan relies on the support of the display screen. In this case, weight of the power supply cable part of the fan that relies on the support of the display screen is obtained in some embodiments, and then working parameters of the bracket are adjusted according to the obtained weight parameters, so that the bracket can support the display screen at different heights or different angles.

Based on the above implementations, the obtained weight parameters of each external device are integrated, so as to obtain the weight parameters of the external devices that need to be carried by the supporting assembly.

In the above implementations, the target positional relationship between the external device and the electronic device can be determined in any of the following manners in some embodiments.

In an implementation manner, an image collection device may be provided at the electronic device in some embodiments. The electronic device is within an image collection range of the image collection device, so that images collected by the image collection device include an image area of the electronic device. Therefore, in some embodiments, an image recognition is performed on the images collected by the image collection device, so as to recognize the target positional relationship between the external device and the electronic device.

Figure 7:
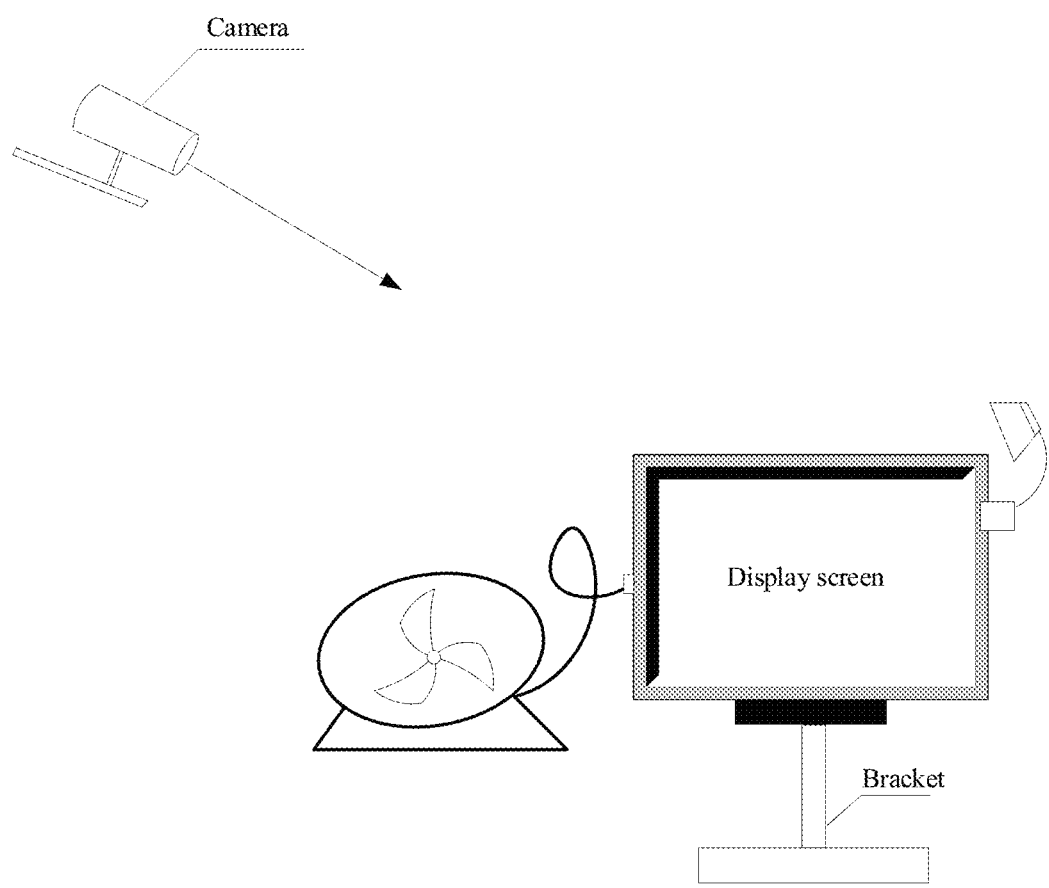
FIG. 7 is an example diagram showing identification of a target positional relationship through a camera according to an embodiment of the present disclosure.

For example, as shown in FIG. 7, a camera is configured in an indoor space where the display screen is located, and the camera is connected to a control apparatus provided at the bracket through a wireless connection. The control apparatus receives images of the display screen collected by the camera, and the images are recognized to recognize the target positional relationship between the external device connected to the display screen and the display screen.

In another implementation manner, a sensor can be arranged at a specific position on the electronic device to carry the external device in some embodiments, and a sensor can be arranged at an interface that can be connected to the external device, so that a force value collected at the interface (downward force value) and a force value collected at the specific position (downward force value) are combined to determine the target positional relationship between the external device and the electronic device. For example, if the force value at the specific position is 0 and the force value at the interface is greater than 0, it indicates that the external device and the electronic device are in the second target positional relationship; if the force value at the specific position is greater than 0 and the force value at the interface is greater than 0, it indicates that the external device and the electronic device are in the first target positional relationship.

Figure 8:
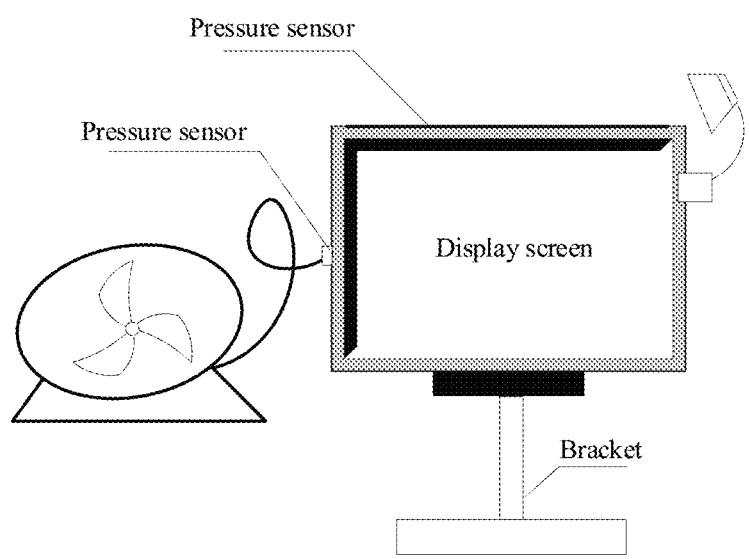
FIG. 8 is an example diagram showing identification of a target positional relationship through a pressure sensor according to an embodiment of the present disclosure.

For example, as shown in FIG. 8, a pressure sensor is arranged on a top plane of the display screen, and pressure sensors are arranged at each interface for connecting the external devices. Therefore, if there is a pressure value on the top plane of the display screen and a pressure value at the interface, it indicates that the external device completely relies on the support of the display screen, which is the first target positional relationship; if there is a pressure value at the interface but no pressure value on the top plane of the display screen, it indicates that only interface part of the external device relies on the support of the display screen, which is the second target positional relationship.

In another implementation manner, the sensor can be arranged at the interface that can be connected to the external device in some embodiments, and device weight of the external device is predicted or read from attribute information of the external device, so that the downward force value collected at the interface and the device weight are combined to determine the target positional relationship between the external device and the electronic device. For example, if the force value at the interface is greater than 0 but significantly less than the device weight corresponding to the external device, which can be a predicted value or read from the attribute information of the external device, it indicates that the external device and the electronic device are in the second target positional relationship; if a difference between the pressure value at the interface and the device weight corresponding to the external device is small, it indicates that the external device and the electronic device are in the first target positional relationship.

For example, in FIG. 8, the pressure sensors are arranged at each interface of the display screen. Therefore, if there is a small difference between the device weight read from the external device and the downward force value collected at the interface, it indicates that the external device completely relies on the support of the display screen, which is the first target positional relationship; if there is a large difference between the device weight read from the external device and the downward force value collected at the interface, it indicates that only the interface part of the external device relies on the support of the display screen, which is the second target positional relationship.

Based on the above implementations, when the weight parameters of the external device are obtained, it can be realized in any of the following manners in some embodiments.

In an implementation manner, when the external device has a communication connection with the electronic device, in some embodiments, the attribute information of the external device may be obtained through the communication connection, so as to at least obtain the weight parameters through the attribute information.

The attribute information may include device specifications, device weight, device serial number, etc. of the external device. The communication connection may be a communication connection realized by a wired connection or a communication connection realized by a wireless connection. In some embodiments, the attribute information of the external device can be actively read through the communication connection between the external device and the electronic device, or the attribute information sent by the external device can be received. Therefore, the weight parameters are obtained through the attribute information.

In some embodiments, the device weight in the attribute information of the external device can be used as the weight parameters of the external device, or the device weight in the attribute information of the external device can be adjusted according to the target positional relationship between the external device and the electronic device to obtain the weight parameters of the external device.

Figure 9:
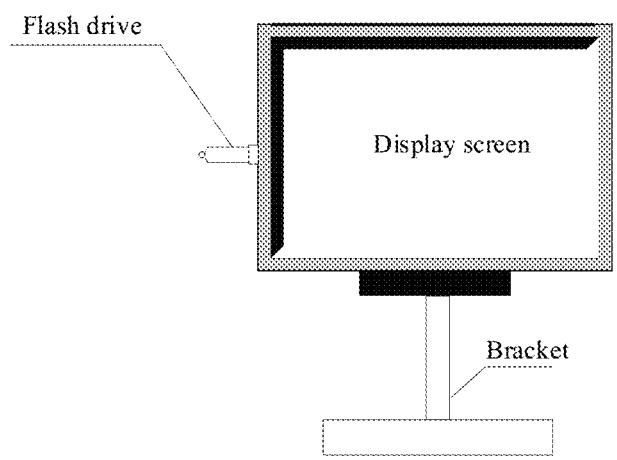
FIG. 9 is an example diagram of a first target positional relationship according to an embodiment of the present disclosure.
Figure 10:
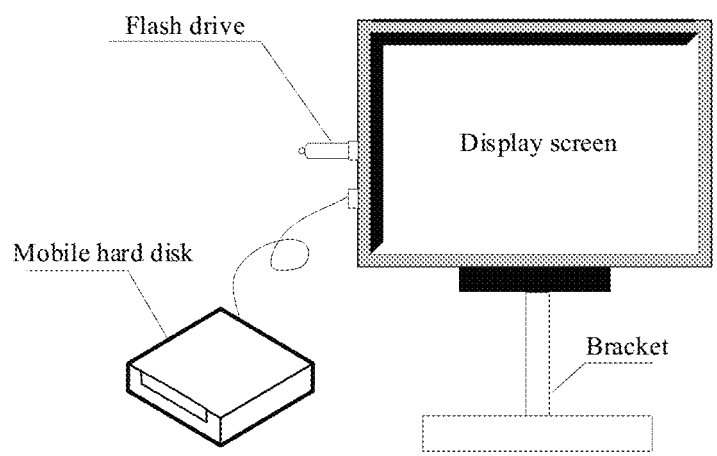
FIG. 10 is an example diagram showing a second target positional relationship according to an embodiment of the present disclosure.

For example, as shown in FIG. 9, the flash drive is inserted into the interface at one side of the display screen. In this scenario, the flash drive completely relies on the support of the display screen, and the device weight in the attribute information of the flash drive can be used as the weight parameters of the flash drive. As another example, as shown in FIG. 10, the mobile hard disk is connected to the interface at one side of the display screen through a data cable, and the mobile hard disk is placed on the platform where the bracket is located. In this scenario, only data cable part of the mobile hard disk relies on the support of the display screen. The pressure value collected by the sensor arranged at the interface can be compared with the device weight in the attribute information. If the pressure value is significantly smaller than the device weight, it indicates that the device weight in the attribute information is not accurate as the weight parameters. In this scenario, the pressure value is used to adapt and reduce the device weight in the attribute information of the mobile hard disk, so as to obtain the weight parameters exerted by the mobile hard disk on the display screen.

In an implementation manner, when the external device does not have a communication connection with the electronic device, in some embodiments, the sensor arranged at the electronic device may be used to obtain the weight parameters of the external device. The sensor herein may be the pressure sensor, which is arranged at the supported assembly of the electronic device.

In some embodiments, sensing parameters collected by the sensor, such as the pressure value, may be received, and then the weights parameter of the external device may be obtained according to the sensing parameters.

For example, in FIG. 5, there is no communication connection between the lighting lamp and the display screen. In this scenario, in some embodiments, a downward force exerted by the lighting lamp on the display screen can be collected according to the pressure sensor arranged at one side of the display screen, so as to obtain the downward weight parameters exerted by the lighting lamp on the display screen according to the collected force value.

In an implementation manner, when the external device has a data connection with the electronic device, in some embodiments, the sensor arranged at the electronic device may be used to obtain the weight parameters of the external device.

In some embodiments, the sensing parameters collected by the sensor, such as the pressure value, may be received, and then the weights parameter of the external device may be obtained according to the sensing parameters.

For example, in FIG. 9, the flash drive is inserted into the interface at one side of the display screen, and a downward force exerted by the flash drive on the display screen can be collected according to the pressure sensor arranged at the interface of the display screen, so as to obtain the downward weight parameters exerted by the flash drive on the display screen according to the collected force value.

In an implementation manner, when the external device does not have a communication connection with the electronic device, in some embodiments, a target terminal that has a communication connection with the external device and the electronic device can be used to obtain the attribute information of the external device, so as to at least obtain the weight parameters through the attribute information.

In some embodiments, the target terminal respectively establishes a communication connection with the external device and the electronic device, so that the attribute information of the external device can be transmitted to the control apparatus corresponding to the supporting assembly of the electronic device through the target terminal, and the control apparatus can obtain the weight parameters according to the attribute information.

Figure 11:
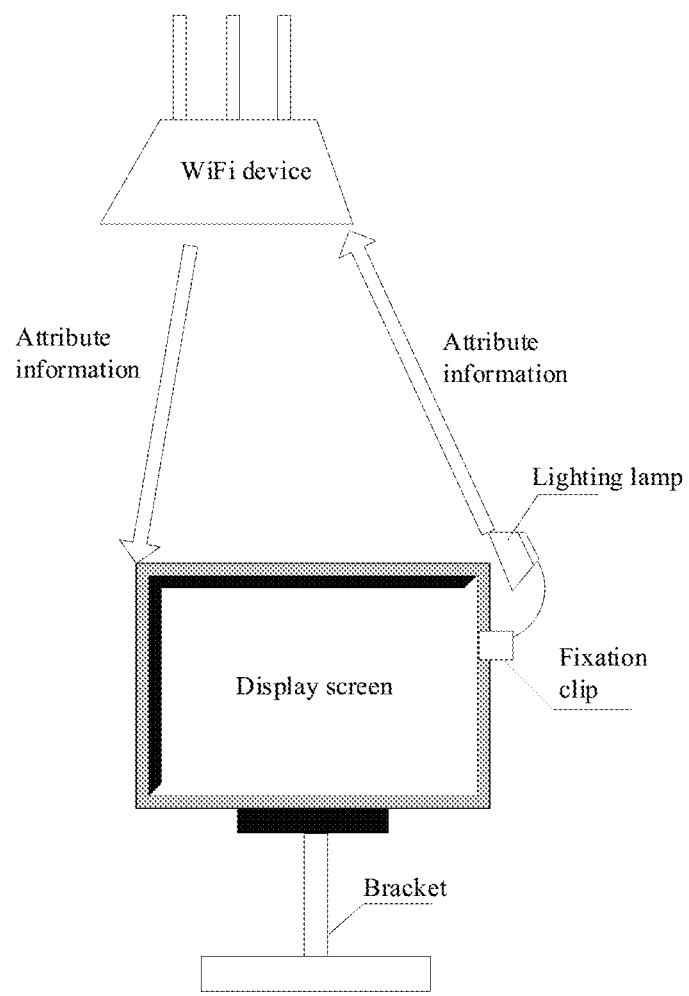
FIG. 11 is an example diagram showing acquisition of weight parameters according to an embodiment of the present disclosure.

For example, as shown in FIG. 11, a WiFi device is configured indoors, and the WiFi device is connected to the lighting lamp and the display screen. Therefore, attribute information of the lighting lamp is sent to the control apparatus in the bracket of the display screen through the WiFi device, and then weight parameters of the lighting lamp are obtained by the control apparatus in the bracket according to the attribute information.

The electronic device may be connected to one or more external devices. When the electronic device is connected to one external device, the weight parameters of the external device, such as the weight parameters of the entire external device or the weight parameters of part of the external device that needs to be carried by the supporting assembly, can be obtained in any of the above manners; when the electronic device is connected to multiple external devices, in some embodiments, the weight parameters of the entire external devices can be obtained with reference to the above-described various manners.

Figure 12:
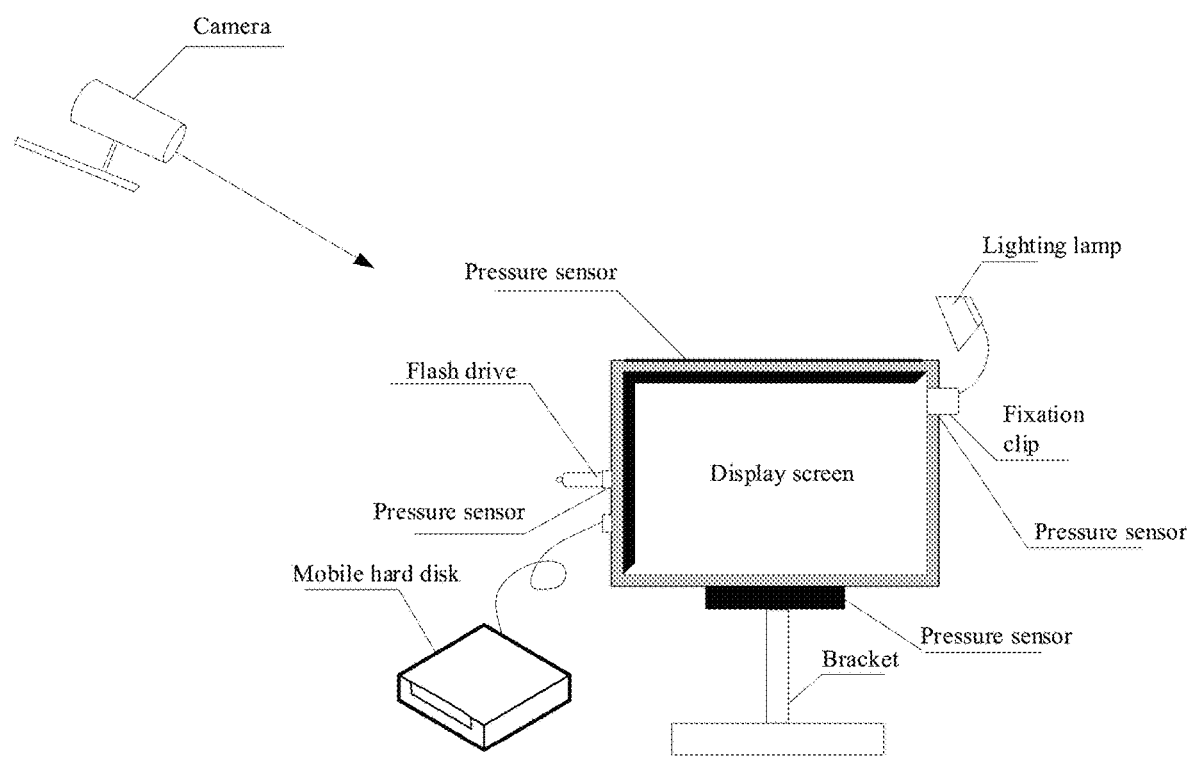
FIG. 12 is another example diagram showing acquisition of weight parameters according to an embodiment of the present disclosure.

For example, as shown in FIG. 12, it is determined through the camera that there is a second target positional relationship between the mobile hard disk and the display screen, a first target positional relationship between the flash drive and the display screen, and a first target positional relationship between the lighting lamp and the display screen. Therefore, in some embodiments, the device weight in the attribute information of the mobile hard disk is obtained through the communication connection between the mobile hard disk and the display screen, and the device weight in the attribute information of the flash drive is obtained through the communication connection between the flash drive and the display screen. The downward force exerted by the lighting lamp at one side of the display screen is collected through the sensor arranged at one side of the display screen, the downward forces exerted on each interface are collected through the sensors configured at the interfaces of the display screen, and the force exerted by the display screen carrying the external devices on the bracket is collected through the sensor arranged between the display screen and the bracket. Therefore, the device weight of the mobile hard disk and the force collected by the sensor at the interface of the mobile hard disk are combined to obtain the downward weight exerted by the mobile hard disk on the display, the device weight of the flash drive and the force collected by the sensor at the interface of the flash drive are combined to obtain the downward weight exerted by the flash drive on the display screen, and the downward weight exerted by the lighting lamp on the display screen is obtained according to the force collected by the sensor at one side of the display screen. The force collected by the sensor that is exerted by the display screen carrying the external devices on the bracket is corrected according to a sum of the weights, so as to obtain the weight parameters of the entire weight exerted by the external devices on the display screen.

Figure 13:
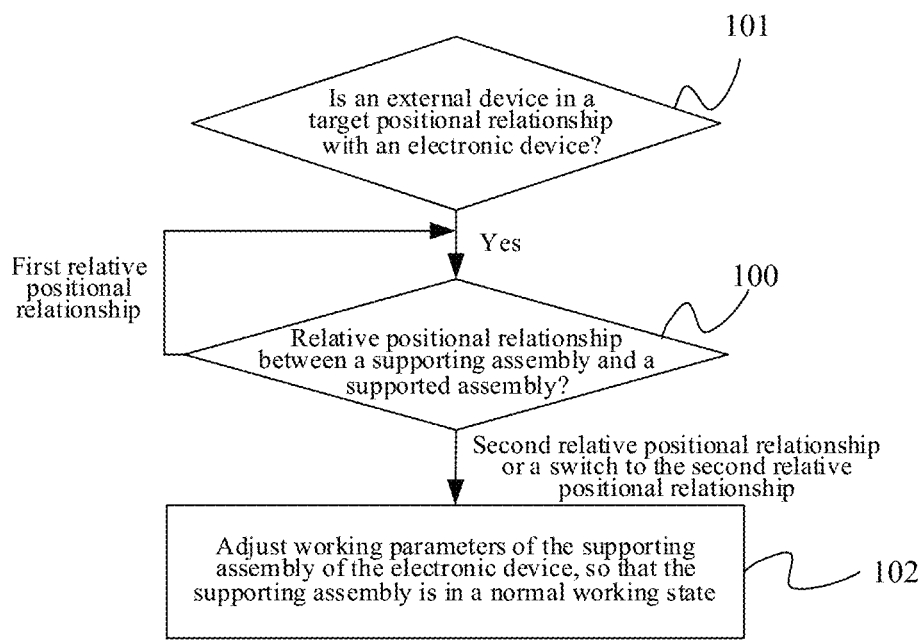
FIG. 13 is another flowchart of a control method according to an example embodiment of the present disclosure.

In an implementation manner, before process 102, the method consistent with the present disclosure may further include the following process, as shown in FIG. 13.

Process 100, detecting relative positional relationship between the supporting assembly and the supported assembly of the electronic device. When the supported assembly and the supporting assembly have a first relative positional relationship, process 102 is not performed, i.e., the relative positional relationship between the supported assembly and the supporting assembly may continue to be detected. When the supported assembly and the supporting assembly have a second relative positional relationship, process 102 is performed. When there is a switch from the first relative positional relationship to the second relative positional relationship between the supported assembly and the supporting assembly have, process 102 is performed.

Figure 14:
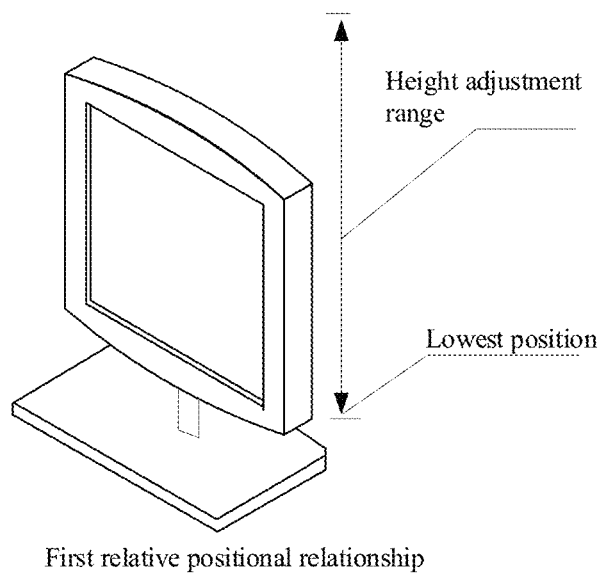
FIG. 14 is an example diagram showing a first relative positional relationship according to an embodiment of the present disclosure.

The first relative positional relationship is a relationship in which the relative positional relationship between the supported assembly and the supporting assembly will not change due to an increased weight carried by the supported assembly. For example, as shown in FIG. 14, the first relative positional relationship is that the display screen is at a lowest position within a height adjustment range provided by the bracket. A relative position between the display screen and the bracket will not change even if the external device such as the lighting lamp or the flash drive is added to the display screen.

Figure 15:
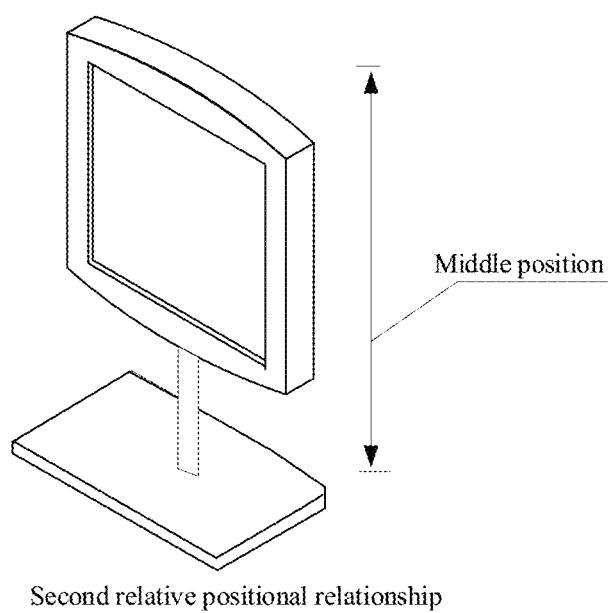
FIG. 15 is an example diagram showing a second relative positional relationship according to an embodiment of the present disclosure.

The second relative positional relationship is a relationship in which the relative positional relationship between the supported assembly and the supporting assembly will change due to the increased or decreased weight carried by the supported assembly. For example, as shown in FIG. 15, the second relative positional relationship is that the display screen is at a middle position within the height adjustment range provided by the bracket. In this scenario, if the external device is added to the display screen, the display screen may slide down along the height adjustment range provided by the bracket due to excessive weight carried by the display screen, and the relative position between the display screen and the bracket will change.

Figure 16:
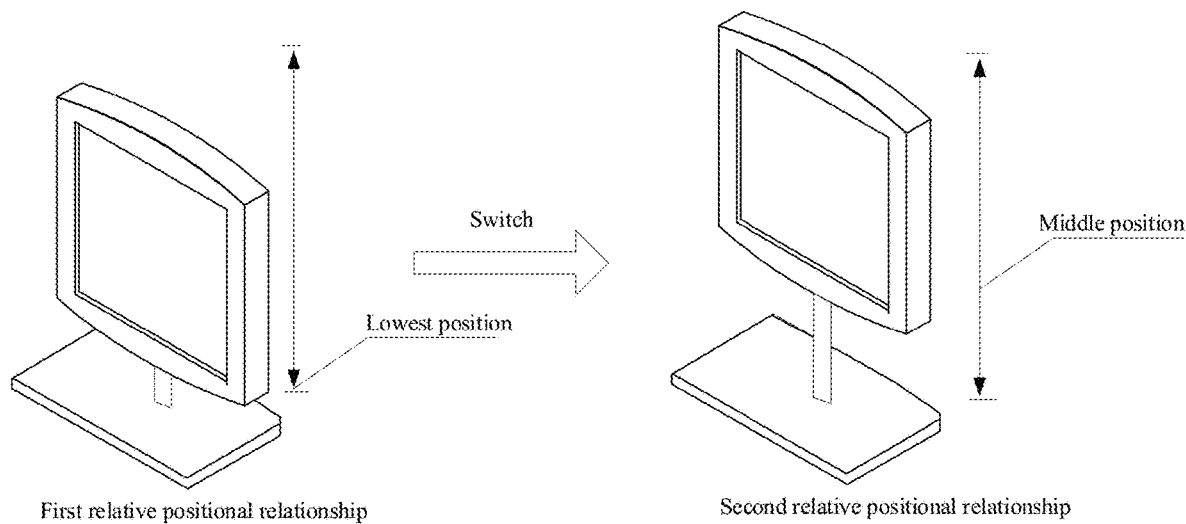
FIG. 16 is an example diagram showing switching from a first relative positional relationship to a second relative positional relationship according to an embodiment of the present disclosure.

There is a switch from the first relative positional relationship to the second relative positional relationship between the supported assembly and the supporting assembly, which means that the supported assembly moves relative to the supporting assembly and moves to a relationship in which the relative positional relationship between the supported assembly and the supporting assembly will change due to the increased or decreased weight carried by the supported assembly. For example, as shown in FIG. 16, the display screen moves upward from the lowest position to the middle position within the height adjustment range. In this scenario, if the external device is added to the display screen, the display screen may slide down along the height adjustment range provided by the bracket due to the excessive weight carried by the display screen, and the relative position between the display screen and the bracket will change.

That is to say, in some embodiments, if there is a relationship between the supported assembly and the supporting assembly that may change due to the increased or decreased weight carried by the supported assembly, then the working parameters of the supporting assembly can be adjusted, so that the supporting assembly can support the electronic device in different postures, which avoids a situation in which the supporting assembly cannot support the electronic device in different postures due to addition or removal of the external devices.

In an implementation manner, when the working parameters of the supporting assembly are adjusted in process 102, the supporting assembly may be adjusted to corresponding supporting capacity according to magnitudes of the weight parameters, so as to achieve a purpose of saving energy consumption of the supporting assembly on the premise that the supporting assembly is in a normal working state.

In another implementation manner, when the working parameters of the supporting assembly are adjusted in process 102, the supporting assembly may be adjusted to maximum supporting capacity when number and/or type of the external devices meet corresponding preset conditions.

That is to say, in some embodiments, it is monitored whether the number and/or types of the external devices meet the corresponding preset conditions. If the preset conditions are met, the supporting assembly may be directly adjusted to the maximum supporting capacity, so as to avoid a situation in which the supporting assembly cannot support the supported assembly and the external devices due to too many external devices.

In some embodiments, the preset conditions may include that the number of the external devices exceeds a preset number threshold, and/or the type of the external device matches a preset device type.

In another implementation manner, when the working parameters of the supporting assembly are adjusted in process 102, the supporting assembly may be first adjusted to the corresponding supporting capacity according to the magnitudes of the weight parameters, i.e., the supporting capacity of the supporting assembly matches the weight parameters. With the continuous increase of the external devices, the supporting capacity of the supporting assembly is getting bigger and bigger, until the number and/or type of the external devices meet the preset conditions. In this scenario, the supporting capacity of the supporting assembly may no longer be adjusted according to the magnitudes of the weight parameters to match the weight parameters, and the supporting capacity of the supporting assembly is directly adjusted to the maximum supporting capacity, so as to avoid the situation in which the supporting assembly cannot support the supported assembly and the external devices due to too many external devices.

In some embodiments, when the working parameters of the supporting assembly are adjusted based on the weight parameters, it can be implemented in any one or more of the following manners.

In an implementation manner, in some embodiments, the magnitudes of the weight parameters are determined first. If the weight parameters are less than or equal to a first threshold, then the supporting force of the supporting assembly is sufficient to support the electronic device in different postures. With an addition or replacement of the external devices, the supporting force of the supporting assembly is insufficient to support the electronic device in different postures. In this scenario, in some embodiments, the supporting force of the supporting assembly needs to be adjusted, i.e., if the weight parameters are greater than the first threshold, supporting force parameters, i.e., magnitude of the supporting force, of the supporting assembly can be adjusted based on the weight parameters. As for specific adjustment methods, reference can be made to the above adjustment methods.

In another implementation manner, in some embodiments, the working parameters of the supporting assembly and the relative positional relationship between the supporting assembly and the supported assembly of the electronic device may be adjusted according to the weight parameters.

After the relative positional relationship between the supporting assembly and the supported assembly is adjusted, the corresponding downward force exerted by the supported assembly on the supporting assembly will change accordingly. For example, an angle between the supported assembly and the supporting assembly is adjusted so that a center of gravity of the supported assembly is shifted, which causes the downward force exerted by the supported assembly on the supporting assembly to be reduced. Therefore, in some embodiments, in addition to adjusting the supporting force of the supporting assembly according to the weight parameters, the relative positional relationship between the supporting assembly and the supported assembly can also be adjusted at the same time. Thus, when the supporting force is adjusted to the maximum supporting capacity, the downward force exerted by the supported assembly on the supporting assembly can be changed by changing the relative positional relationship between the supporting assembly and the supported assembly. In this case, the supporting force of the supporting assembly can still be sufficient to support the downward force exerted by the supported assembly and the external devices on the supporting assembly, which avoids the situation in which the supporting assembly cannot support the supported assembly and the external devices due to too many external devices.

Based on the above implementations, in some embodiments, when the supporting force parameters (that is, the magnitude of the supporting force) provided by the supporting assembly are adjusted based on the weight parameters, it can be implemented in one or more of the following manners.

In an implementation manner, the supporting assembly has a support member and an electromagnetic assembly. After being energized, the electromagnetic assembly can cooperate with the supporting assembly to generate a friction force, and the friction force enables the support member to provide the supporting force to support the supported assembly and the external devices. Therefore, in some embodiments, power supply parameters for supplying power to the electromagnetic assembly in the supporting assembly can be determined based on the weight parameters, and then the electromagnetic assembly is controlled to generate corresponding friction force parameters based on the power supply parameters, so that the electromagnetic assembly can cooperate with the support member to provide the supporting force needed to support the supported assembly and the external devices.

In some embodiments, corresponding power supply current can be determined according to the magnitudes of the weight parameters, and then the electromagnetic assembly is powered according to the power supply current, so that the friction force is generated between the electromagnetic assembly and the support member, and the frictional force enables the bracket to provide the supporting force needed to support the supported assembly and the external devices.

Figure 17:
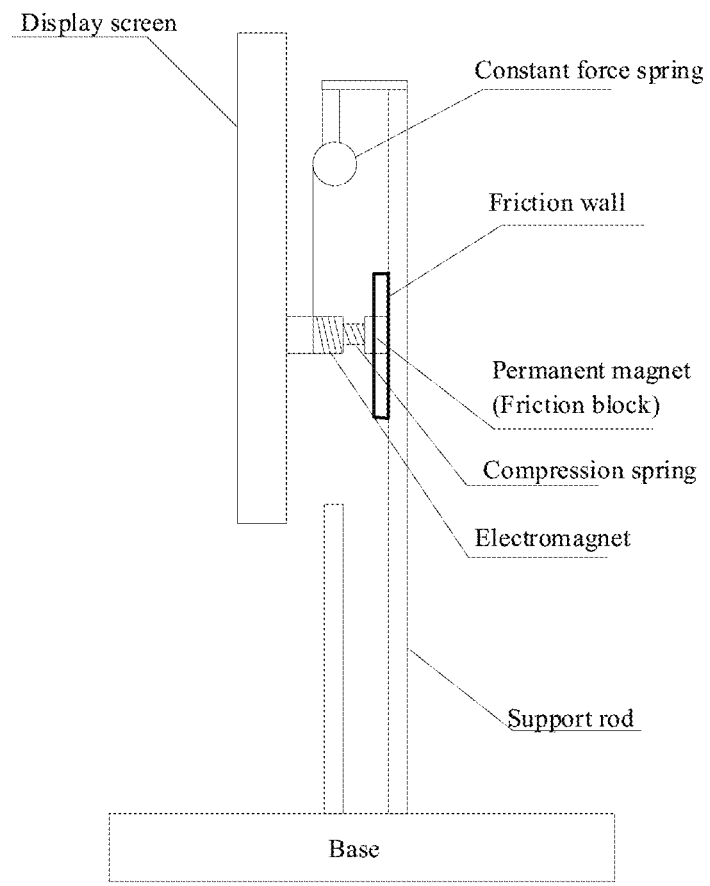
FIG. 17 is an example diagram showing adjustment of a supporting force of a supporting assembly according to an embodiment of the present disclosure.

For example, as shown in a side view of the display screen in FIG. 17, a constant force spring, an electromagnet, a friction block, and a base are arranged at the bracket. The constant force spring is configured to pull the display screen to move upward with a constant force, and a coil is wound at the electromagnet. A compression spring is connected between the electromagnet and the friction block, and the friction block is in contact with a friction wall at a support rod of the base. After the electromagnet is energized, a magnetic field is generated at the electromagnet, and the electromagnet generates magnetism. One end of the electromagnet close to the friction block is attracted to a permanent magnet fixed at the friction block, so that the compression spring between the electromagnet and the friction block is compressed, which generates pressure between the friction block and the friction wall. There is a friction force between the friction block and the friction wall sliding up and down. If there are too many external devices carried by the display screen, the weight of the display screen will be too large, so that a sum of the constant force and the weight of the display screen is greater than the friction force between the friction block and the friction wall, which causes the display screen to fall and cannot be maintained at a fixed height. Therefore, in some embodiments, after the weight parameters of the external devices are obtained, the power supply current of the electromagnet is adjusted according to the weight parameters, so as to increase or decrease an attractive force between the electromagnet and the friction block, and then to increase or decrease the friction force between the friction block and the friction wall, which prevents the display screen from falling because it is too heavy or prevents the display screen from rising because it is too light, so that the display screen can be kept at a fixed height.

In another implementation manner, in some embodiments, number of the support members that are needed to provide elastic support in the supporting assembly can be determined based on the weight parameters, so that the corresponding number of the support members can be used to provide the supporting force needed to support the supported assembly and the external devices.

Figure 18:
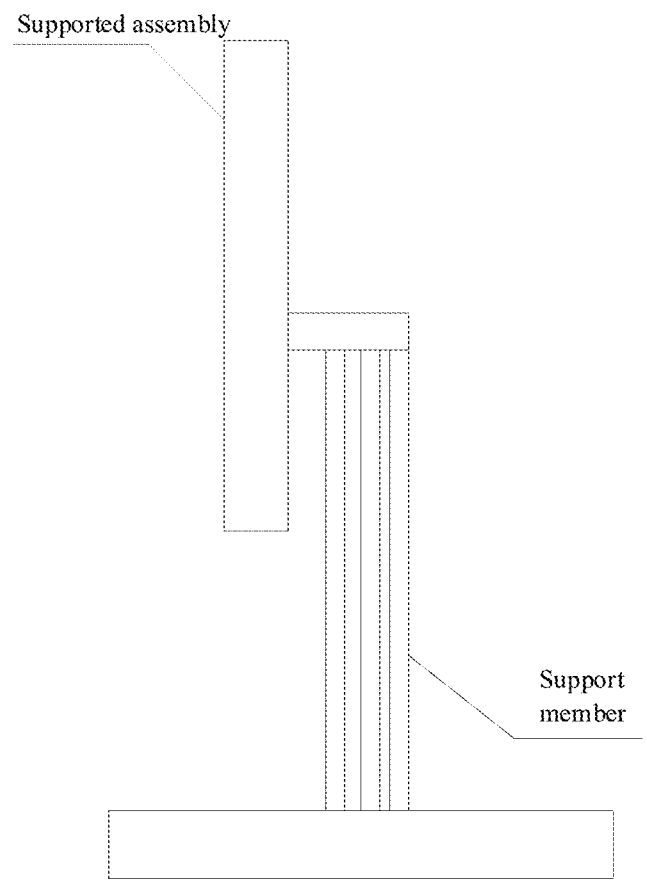
FIG. 18 is another example diagram showing adjustment of a supporting force of a supporting assembly according to an embodiment of the present disclosure.

For example, as shown in a side view of the electronic device in FIG. 18, the supporting assembly includes a plurality of support members that provide the elastic support. Based on the technical solutions in the embodiments of the present disclosure, the supporting assembly provides the supporting force of the corresponding magnitude with the corresponding number of the support members according to the weight parameters to be carried. The more the external devices connected to the supporting assembly, the more the support members are provided in the supporting assembly.

In another implementation manner, in some embodiments, control parameters of an auxiliary support structure can be determined based on the weight parameters, where the auxiliary support structure is arranged between the supported assembly and the supporting assembly. Then the supporting force provided by the auxiliary support structure is controlled based on the control parameters, so as to cooperate with the supporting assembly to provide the supporting force needed to support the supported assembly and the external devices.

Figure 19:
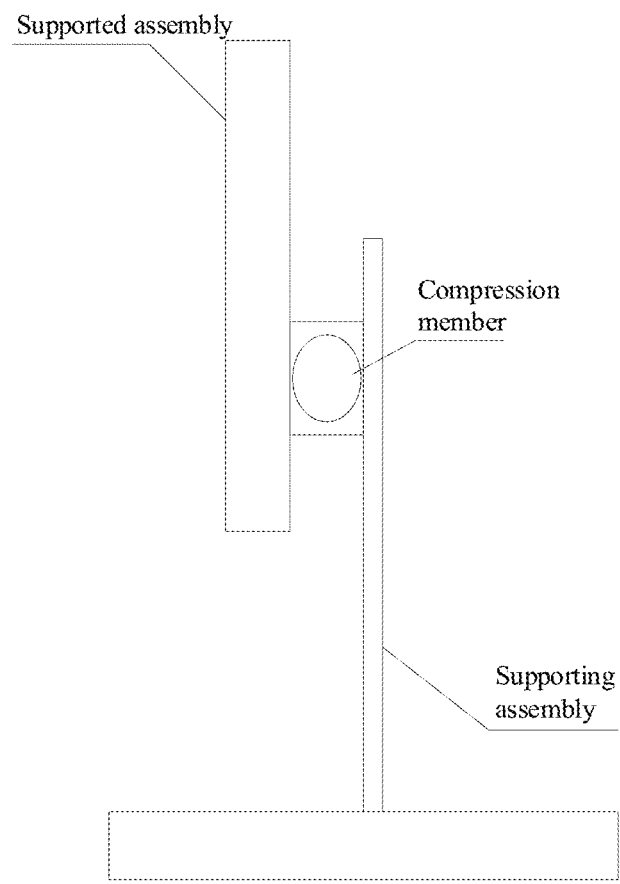
FIG. 19 is another example diagram showing adjustment of a supporting force of a supporting assembly according to an embodiment of the present disclosure.

For example, as shown in FIG. 19, a compression member is provided between the supporting assembly and the supported assembly as the auxiliary support structure, and the compression member can provide the supporting force to support the supported assembly and the external devices. In some embodiments, when the supporting force provided by the supporting assembly is adjusted, adjustment of the supporting force can be realized by adjustment of the control parameters of the compression member. For example, in some embodiments, the compression member is controlled to expand so that a sliding friction force between the compression member and the supporting assembly is larger, so as to increase the supporting force provided to the supported assembly and the external devices. In some other embodiments, the compression member can be controlled to shrink so that the sliding friction force between the compression member and the supporting assembly is smaller, so as to reduce the supporting force provided to the supported assembly and the external devices. In some embodiments, an expansion degree of the compression member corresponds to the weight parameters, so that the compression member can cooperate with the supporting assembly to provide the supporting force needed to support the supported assembly and the external devices.

Figure 20:
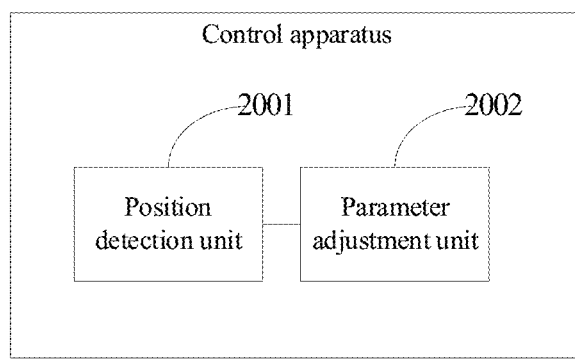
FIG. 20 is a schematic structural diagram of a control apparatus according to another example embodiment of the present disclosure.

FIG. 20 is a schematic structural diagram of a control apparatus according to another example embodiment of the present disclosure. The apparatus can be arranged at the supporting assembly that can support the electronic device in different postures, such as the bracket of the display screen. The technical solutions in the embodiments of the present disclosure are mainly used to improve the user experience of the electronic device.

In some embodiments, the apparatus includes a position detection unit 2001 and a parameter adjustment unit 2002. The position detection unit 2001 is configured to detect whether any external device is in a target positional relationship with the electronic device, and trigger the parameter adjustment unit when it is detected that at least one external device is in a target positional relationship with the electronic device. The parameter adjustment unit 2002 is configured to adjust the working parameters of the supporting assembly of the electronic device, so that the supporting assembly is in a normal working state. In a normal working state, the supporting assembly can support the electronic device in different postures.

It can be seen from the above scheme that in the control apparatus consistent with the present disclosure, the external device is detected, and then when it is detected that there is a target positional relationship between the external device and the electronic device, it can be determined that the supporting assembly may not be in a normal working state due to a change in the weight carried by the supporting assembly. Therefore, in some embodiments, the working parameters of the supporting assembly can be adjusted, so that the supporting assembly can be in a normal working state, and then the supporting assembly can support the electronic device in different postures. As such, a situation in which the user experience of the electronic device is poor because the electronic device cannot be in different postures due to the external device is avoided, which achieves a purpose of improving the use experience of the electronic device.

In an implementation manner, the parameter adjustment unit 2002 is configured to obtain the weight parameters of the external device, and adjust the working parameters of the supporting assembly based on the weight parameters.

In some embodiments, when the weight parameters of the external device are obtained in the parameter adjustment unit 2002, it can be implemented by at least one of the following: the weight parameters of the external device are obtained when the external device and the electronic device are in the first target positional relationship, where the first target positional relationship represents that the external device completely relies on the supported assembly of the electronic device for carrying, and the supported assembly relies on the support of the supporting assembly; the weight parameters of the external device carried by the supported assembly of the electronic device are obtained when the external device and the electronic device are in the second target positional relationship, where the second target positional relationship represents that the external device partially relies on the supported assembly for carrying, and the supported assembly relies on the support of the supporting assembly.

In some embodiments, when the weight parameters of the external device are obtained in the parameter adjustment unit 2002, it can be implemented by at least one of the following: when the external device has a communication connection with the electronic device, the attribute information of the external device is obtained through the communication connection, so as to at least obtain the weight parameters through the attribute information; when the external device does not have a communication connection with the electronic device, the sensor arranged at the electronic device is used to obtain the weight parameters of the external device; when the external device has a communication connection with the electronic device, the sensor arranged at the electronic device is used to obtain the weight parameters of the external device; when the external device does not have a communication connection with the electronic device, the target terminal that has a communication connection with the external device and the electronic device is used to obtain the attribute information of the external device, so as to at least obtain the weight parameters through the attribute information.

Figure 21:
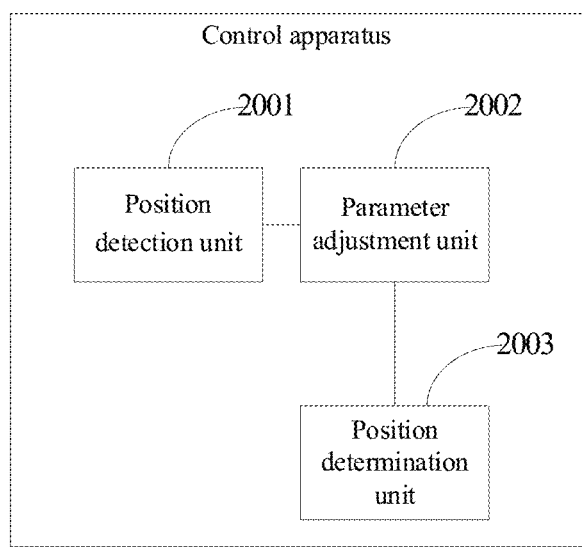
FIG. 21 is another schematic structural diagram of a control apparatus according to another example embodiment of the present disclosure.

In some embodiments, the apparatus consistent with the present disclosure also includes a position determination unit 2003, as shown in FIG. 21, which is configured to determine the relative positional relationship between the supporting assembly and the supported assembly of the electronic device. When the supported assembly and the supporting assembly have the first relative positional relationship, the parameter adjustment unit 2002 is not triggered; when the supported assembly and the supporting assembly have the second relative positional relationship, or there is a switch from the first relative positional relationship to the second relative positional relationship between the supported assembly and the supporting assembly, the parameter adjustment unit 2002 is triggered.

In some embodiments, when adjusting the working parameters of the supporting assembly, the parameter adjustment unit 2002 is configured to adjust the supporting assembly to the maximum supporting capacity when the number and/or type of the external devices meet the corresponding preset conditions.

In some embodiments, when the parameter adjustment unit 2002 adjusts the working parameters of the supporting assembly based on the weight parameters, it can be implemented by at least one of the following: if the weight parameters are greater than the first threshold, the supporting force parameters provided by the supporting assembly are adjusted based on the weight parameters, where the supporting force parameters include the magnitude of the supporting force; the working parameters of the supporting assembly and the relative positional relationship between the supporting assembly and the supported assembly of the electronic device are adjusted based on the weight parameters.

In some embodiments, when the parameter adjustment unit 2002 adjusts the supporting force parameters provided by the supporting assembly based on the weight parameters, it can be implemented by at least one of the following: the power supply parameters for supplying power to the electromagnetic assembly in the supporting assembly are determined based on the weight parameters, where the electromagnetic assembly can cooperate with the supporting assembly to generate the friction force, and the electromagnetic assembly is controlled to generate the corresponding friction force parameters based on the power supply parameters, so that the electromagnetic assembly can cooperate with the support member to provide the supporting force needed to support the supported assembly and the external devices; the number of the support members that are needed to provide the elastic support in the supporting assembly is determined based on the weight parameters, so that the corresponding number of the support members can be used to provide the supporting force needed to support the supported assembly and the external devices; the control parameters of the auxiliary support structure are determined based on the weight parameters, where the auxiliary support structure is arranged between the supported assembly and the supporting assembly, and the supporting force provided by the auxiliary support structure is controlled based on the control parameters, so as to cooperate with the supporting assembly to provide the supporting force needed to support the supported assembly and the external devices.

As for specific implementations of each unit in the embodiments of the present disclosure, reference may be made to the corresponding content above, which will not be described in detail herein.

Figure 22:
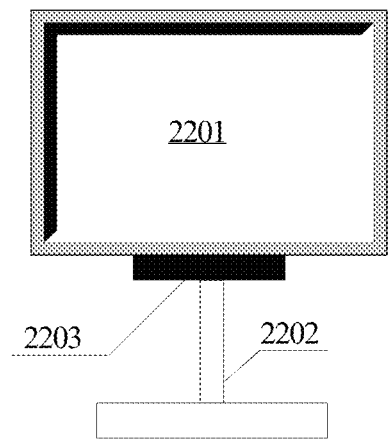
FIG. 22 is a schematic structural diagram of an electronic device according to another example embodiment of the present disclosure.

FIG. 22 is a schematic structural diagram of an electronic device according to another example embodiment of the present disclosure. The electronic device includes the supporting assembly that can support the electronic device in different postures, such as a display including the display screen and the bracket. The technical solutions in the embodiments of the present disclosure are mainly used to improve the user experience of the electronic device.

In some embodiments, the electronic device includes a supported assembly 2201, a supporting assembly 2202, and a control apparatus 2203. The supported assembly 2201 can be connected with the external devices. The supporting assembly 2202 is at least configured to support the supported assembly 2201 in a normal working state, so that the electronic device can be in different postures. The control apparatus 2203 is configured to adjust the working parameters of the supporting assembly 2202 when it is detected that at least one external device is in a target positional relationship with the electronic device, so that the supporting assembly 2202 is in a normal working state.

It can be seen from the above scheme that in the electronic device consistent with the present disclosure, the external device is detected, and then when it is detected that there is a target positional relationship between the external device and the electronic device, it can be determined that the supporting assembly may not be in a normal working state due to a change in the weight carried by the supporting assembly. Therefore, in some embodiments, the working parameters of the supporting assembly can be adjusted, so that the supporting assembly can be in a normal working state, and then the supporting assembly can support the electronic device in different postures. As such, a situation in which the user experience of the electronic device is poor because the electronic device cannot be in different postures due to the external device is avoided, which achieves a purpose of improving the use experience of the electronic device.

Figure 23:
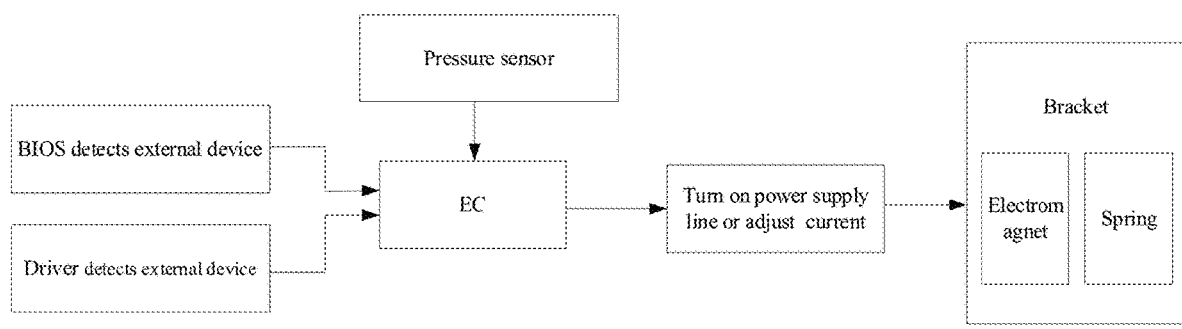
FIG. 23 is an example diagram of bracket control applicable to a display screen according to an embodiment of the present disclosure.

In an example of the display screen shown in FIG. 17, as shown in FIG. 23, when a user inserts an external device such as a cam, a led, or a speaker into the display screen, a basic input output system (BIOS) and a driver in the display screen can respectively detect various external devices, and then an embedded controller (EC) in the display screen is informed of number of the inserted external devices. When the user places a non-electronic device such as a shelf or a lighting lamp at the display screen, the weight is determined by the pressure sensor arranged at a shaft of the bracket, and then the EC is informed of a placement of the external device. Therefore, through the above method, the EC calculates whether to turn on a power supply line at the electromagnet or magnitude of current in the power supply line, and then turns on the power supply line or adjusts the magnitude of the current in the power supply line. After the electromagnet is energized or the current is increased, a spiral coil generates a magnetic field and at the same time, a soft iron in the middle is magnetized to generate magnetism. The friction block is fixed at the permanent magnet, and the magnetism of the electromagnet and the permanent magnet attract each other. The spring in the middle is compressed, so that the pressure between the friction block and the friction wall increases, and the friction force sliding up and down increases. The greater the current, the greater the pressure, and the greater the friction force sliding up and down, so that a greater weight of the display screen and the external devices can be supported, which avoids a situation in which the display screen cannot be fixed to a corresponding posture relative to the bracket.

The various embodiments in this specification are described in a progressive manner. Each embodiment focuses on the differences from other embodiments, and for the same or similar parts between the various embodiments, reference can be made to each other. For the apparatuses disclosed in the embodiments, since they correspond to the methods disclosed in the embodiments, the descriptions are relatively simple, and for relevant information, reference can be made to the descriptions of the methods.

Those skilled in the art can further realize that the units and algorithm processes of the examples described with reference to the embodiments disclosed herein can be implemented by electronic hardware, computer software, or a combination of the two. In order to clearly illustrate the interchangeability of hardware and software, the composition and processes of the examples have been generally described in terms of functions in the above description. Whether these functions are executed by hardware or software depends on specific applications and design constraints of the technical solutions. Those skilled in the art may use different methods to implement the described functions for each specific application, and such implementation should not be regarded as exceeding the scope of the present disclosure.

The processes of the methods or algorithms described with reference to the embodiments disclosed herein may be directly implemented by hardware, software modules executed by a processor, or a combination of the two. The software modules can be provided in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure is not limited to the embodiments shown herein, but should conform to the widest scope consistent with the principles and novel features disclosed herein.

What is claimed is:

1. A control method comprising:
   in response to detecting that an external device is in a target positional relationship with an electronic device, adjusting a working parameter of a supporting assembly of the electronic device by obtaining a weight parameter of the external device, so that the supporting assembly is in a normal working state;
   wherein in the normal working state, the supporting assembly is able to support the electronic device in different postures.

2. The method of claim 1, wherein obtaining the weight parameter of the external device includes at least one of:
   obtaining the weight parameter of the external device in response to that the external device and the electronic device are in a first target positional relationship, the first target positional relationship representing that the external device is completely carried by a supported assembly of the electronic device, and the supported assembly being carried by the supporting assembly; or
   obtaining the weight parameter of the external device shared by the supported assembly of the electronic device in response to that the external device and the electronic device are in a second target positional relationship, the second target positional relationship representing that the external device is partially carried by the supported assembly.

3. The method of claim 1, wherein obtaining the weight parameter of the external device includes:
   in response to that the external device has a communication connection with the electronic device, obtaining attribute information of the external device through the communication connection, and obtaining the weight parameter at least through the attribute information.

4. The method of claim 1, wherein obtaining the weight parameter of the external device includes:
   in response to that the external device does not have a communication connection with the electronic device, obtaining the weight parameter of the external device using a sensor arranged at the electronic device.

5. The method of claim 1, wherein obtaining the weight parameter of the external device includes:
   in response to that the external device has a communication connection with the electronic device, obtaining the weight parameter of the external device using a sensor arranged at the electronic device.

6. The method of claim 1, wherein adjusting the working parameter of the supporting assembly based on the weight parameter includes:
   in response to the weight parameter being greater than a threshold, adjusting a supporting force parameter provided by the supporting assembly based on the weight parameter, the supporting force parameter including a magnitude of a supporting force.

7. The method of claim 6, wherein adjusting the supporting force parameter provided by the supporting assembly based on the weight parameter includes:
   determining a power supply parameter for supplying power to an electromagnetic assembly of the supporting assembly based on the weight parameter, the electromagnetic assembly being configured to cooperate with the supporting assembly to generate a friction force, and the electromagnetic assembly being controlled to generate a corresponding friction force parameter based on the power supply parameter, to cooperate with a support member of the supporting assembly to provide a supporting force needed to support the supported assembly and the external device.

8. The method of claim 6, wherein adjusting the supporting force parameter provided by the supporting assembly based on the weight parameter includes:
   determining a number of support members of the supporting assembly that are needed to provide an elastic support based on the weight parameter, so that the number of the support members are used to provide a supporting force needed to support the supported assembly and the external device.

9. The method of claim 6, wherein adjusting the supporting force parameter provided by the supporting assembly based on the weight parameter includes:
   determining a control parameter of an auxiliary support structure based on the weight parameter, the auxiliary support structure being arranged between the supported assembly and the supporting assembly, and a supporting force provided by the auxiliary support structure being controlled based on the control parameter, so as to cooperate with the supporting assembly to provide the supporting force needed to support the supported assembly and the external device.

10. The method of claim 1, wherein adjusting the working parameter of the supporting assembly based on the weight parameter includes:
    adjusting the working parameter of the supporting assembly and a relative positional relationship between the supporting assembly and a supported assembly of the electronic device based on the weight parameter.

11. The method of claim 1, further comprising:
    determining a relative positional relationship between the supporting assembly and a supported assembly of the electronic device; and
    in response to that the supported assembly and the supporting assembly have a specific relative positional relationship, not performing the process of adjusting the working parameter of the supporting assembly of the electronic device is not performed, the specific relative positional relationship being a relationship in which the relative positional relationship between the supporting assembly and the supported assembly does not change by increasing of weight carried by the supported assembly.

12. The method of claim 1, further comprising:

determining a relative positional relationship between the supporting assembly and a supported assembly of the electronic device; and in response to that the relative positional relationship between the supporting assembly and the supported assembly switches from a first relative positional relationship to a second relative positional relationship or the supported assembly and the supporting assembly have the second relative positional relationship, performing the process of adjusting the working parameter of the supporting assembly of the electronic device, the first relative positional relationship being a relationship in which the relative positional relationship between the supporting assembly and the supported assembly does not change by increasing of weight carried by the supported assembly, and the second relative positional relationship being a relationship in which the relative positional relationship between the supporting assembly and the supported assembly changes due to increasing or decreasing of the weight carried by the supported assembly.

13. The method of claim 1, wherein adjusting the working parameter of the supporting assembly of the electronic device includes, in response to that number and/or type of the external device meets a corresponding preset condition, adjusting the supporting assembly to a maximum supporting capacity.

14. An electronic device comprising:

a supported assembly configured to connect with an external device;

a supporting assembly at least configured to support the supported assembly in a normal working state, so that the electronic device is able to be in different postures; and a control apparatus configured to adjust a working parameter of the supporting assembly on by obtaining a weight parameter of the external device in response to detecting that an external device is in a target positional relationship with the electronic device, so that the supporting assembly is in the normal working state.

15. The electronic device of claim 14, wherein the control apparatus is further configured to perform at least one of:

obtaining the weight parameter of the external device in response to that the external device and the electronic device are in a first target positional relationship, the first target positional relationship representing that the external device is completely carried by a supported assembly of the electronic device, and the supported assembly being carried by the supporting assembly; or obtaining the weight parameter of the external device shared by the supported assembly of the electronic device in response to that the external device and the electronic device are in a second target positional relationship, the second target positional relationship representing that the external device is partially carried by the supported assembly.

16. The electronic device of claim 14, wherein the control apparatus is further configured to:

in response to that the external device has a communication connection with the electronic device, obtain attribute information of the external device through the communication connection, and obtain the weight parameter at least through the attribute information.

17. The electronic device of claim 14, wherein the control apparatus is further configured to:

in response to that the external device does not have a communication connection with the electronic device, obtain the weight parameter of the external device using a sensor arranged at the electronic device.

* * * * *